(12) United States Patent
Okamoto et al.

(10) Patent No.: US 9,871,937 B2
(45) Date of Patent: Jan. 16, 2018

(54) CONTROL DEVICE, PROCESSING DEVICE, CONTROL METHOD, AND NON-TRANSITORY COMPUTER READABLE MEDIUM

(71) Applicant: FUJI XEROX CO., LTD., Tokyo (JP)

(72) Inventors: Kensuke Okamoto, Yokohama (JP);
Yuichi Kawata, Yokohama (JP);
Hideki Yamasaki, Yokohama (JP);
Ryoko Saitoh, Yokohama (JP);
Yoshifumi Bando, Yokohama (JP);
Tomoyo Nishida, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/202,312

(22) Filed: Jul. 5, 2016

(65) Prior Publication Data
US 2017/0264766 A1 Sep. 14, 2017

(30) Foreign Application Priority Data

Mar. 11, 2016 (JP) ................. 2016-048444

(51) Int. Cl.
*G06F 3/12* (2006.01)
*H04N 1/00* (2006.01)
*G06K 9/00* (2006.01)

(52) U.S. Cl.
CPC ..... *H04N 1/00891* (2013.01); *G06K 9/00255* (2013.01); *G06K 9/00295* (2013.01); *H04N 1/00336* (2013.01)

(58) Field of Classification Search
CPC ........... H04N 1/00891; H04N 1/00336; G06K 9/00255; G06K 9/00295

USPC ........................................................ 358/1.13
See application file for complete search history.

(56) References Cited

U.S. PATENT DOCUMENTS

| 2008/0277486 | A1* | 11/2008 | Seem .............. F24F 11/0009 236/49.3 |
| 2011/0109937 | A1* | 5/2011 | Fujiki .............. H04N 1/00885 358/1.15 |
| 2013/0010335 | A1 | 1/2013 | Baba et al. |
| 2013/0030592 | A1* | 1/2013 | Magori ............. G06Q 10/06 700/295 |
| 2013/0184876 | A1 | 7/2013 | Roshen et al. |
| 2014/0160505 | A1* | 6/2014 | Tachikawa ........ H04N 1/00891 358/1.13 |

(Continued)

FOREIGN PATENT DOCUMENTS

| JP | 2005-088521 A | 4/2005 |
| JP | 2011-172132 A | 9/2011 |

OTHER PUBLICATIONS

Jul. 14, 2017 Extended Search Report issued in European Patent Application No. 16182314.1.

*Primary Examiner* — Neil R McLean
(74) *Attorney, Agent, or Firm* — Oliff PLC

(57) ABSTRACT

A control device is provided and includes: an acquisition unit that acquires the number of persons from a count unit, the count unit counting up the number of persons in an area based on a detection result of a first detection unit, the first detection unit detecting a person who goes in and out through an entrance of the area; and an operation mode control unit that controls an operation mode of a processing device according to the acquired number of persons.

9 Claims, 3 Drawing Sheets

(56) References Cited

U.S. PATENT DOCUMENTS

2014/0266153 A1    9/2014  Fujiwara et al.
2014/0277757 A1*   9/2014  Wang ................. G05D 23/1927
                                                    700/276

* cited by examiner

CONTROL DEVICE, PROCESSING DEVICE, CONTROL METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-048444 filed on Mar. 11, 2016.

(i) TECHNICAL FIELD

The present invention relates to a control device, a processing device, a control method, and a non-transitory computer readable medium.

(ii) RELATED ART

There is proposed a technique for suppressing power consumption of an apparatus during a period when there is no user.

SUMMARY

An aspect of the invention provides a control device including:

an acquisition unit that acquires the number of persons from a count unit, the count unit counting up the number of persons in an area based on a detection result of a first detection unit, the first detection unit detecting a person who goes in and out through an entrance of the area; and an operation mode control unit that controls an operation mode of a processing device according to the acquired number of persons.

BRIEF DESCRIPTION OF THE DRAWINGS

Exemplary embodiment(s) of the present invention will be described in detail based on the following figures, wherein.

DETAILED DESCRIPTION

1. Configuration

Figure 1:
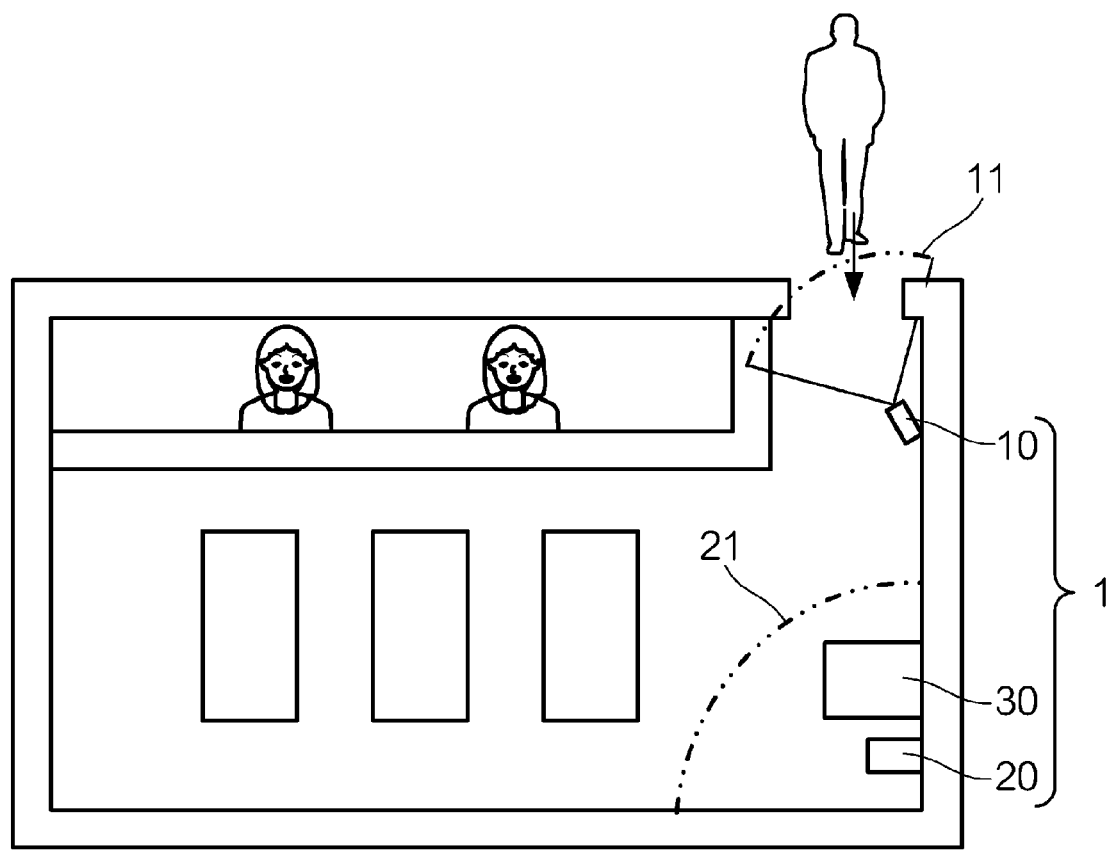
FIG. 1 is a diagram illustrating an example of an image processing system.

FIG. 1 is a diagram illustrating an example of an image processing system 1 according to an exemplary embodiment of the invention. An image processing system 1 is installed in an area having an entrance in such as a store, a building, or a room. The image processing system 1 includes an imaging device 10, a detecting device 20, and an image processing apparatus 30. The detecting device 20 is an example of a second detection unit of the invention. The image processing apparatus 30 is an example of a processing device of the invention. The imaging device 10 and the detecting device 20 are connected to the image processing apparatus 30 through a communication line. The communication line may be configured in a wired or wireless manner.

The imaging device 10 is installed in the vicinity of the entrance of the area. The imaging device 10 takes an image in an image taking range 11 including the entrance. The imaging device 10 transmits the taken image to the image processing apparatus 30.

The detecting device 20 is installed at a position where the face of a user who uses the image processing apparatus 30 can be taken from the front side. The detecting device 20 includes an imaging device. The imaging device takes an image of a detecting range 21 provided in the vicinity of the image processing apparatus 30. The detecting device 20 performs image processing using the image taken by the imaging device so as to detect a person in the detecting range 21 in a given time interval. For the detection, there may be used a well-known technique such as an inter-frame difference method or a background difference method. In a case where a person is detected in the detecting range 21, the detecting device 20 transmits detection information to the image processing apparatus 30.

In addition, the detecting device 20 performs the image processing using the image taken by the imaging device so as to determine whether the person detected in the detecting range 21 is in front of the image processing apparatus 30 while facing the image processing apparatus 30. The place in front of the image processing apparatus 30 means a place where the person stands to operate the image processing apparatus 30. Specifically, when the person detected in the detecting range 21 moves to the place in front of the image processing apparatus 30, the detecting device 20 recognizes the face of the person in front of the image processing apparatus 30 from the image taken by the imaging device. For this recognition, there may be used a well-known technique disclosed in JP-A-2005-92262 and JP-A-2005-202543, for example. In a case where the face facing forward is recognized, the detecting device 20 determines that the person detected in the detecting range 21 is in front of the image processing apparatus 30 while facing the image processing apparatus 30. In this case, the detecting device 20 transmits first determination information to the image processing apparatus 30. On the other hand, in a case where the face facing forward is not recognized, the detecting device 20 determines that the person detected in the detecting range 21 is in front of the image processing apparatus 30 but not facing the image processing apparatus 30. In this case, the detecting device 20 transmits second determination information to the image processing apparatus 30.

Figure 2:
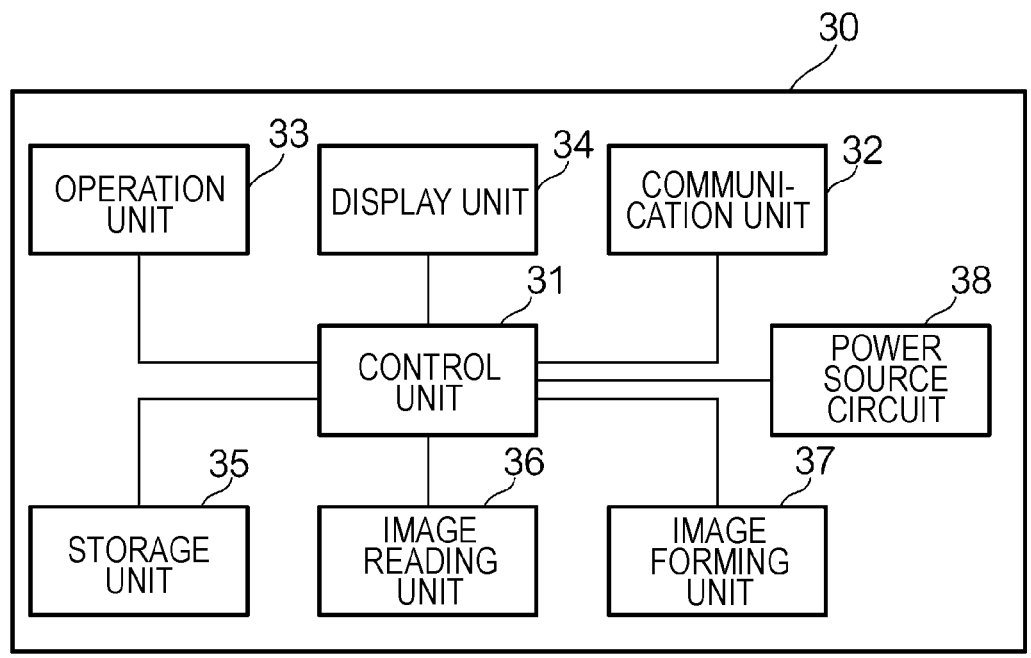
FIG. 2 is a diagram illustrating a hardware configuration of an image processing apparatus.

FIG. 2 is a diagram illustrating a hardware configuration of the image processing apparatus 30. The image processing apparatus 30 has plural functions such as a copy function, a print function, and a facsimile function. The image processing apparatus 30 is provided with a control unit 31, a communication unit 32, an operation unit 33, a display unit 34, a storage unit 35, an image reading unit 36, an image forming unit 37, and a power source circuit 38. The control unit 31 is an example of a control device of the invention.

The control unit 31 is configured with a CPU (Central Processing Unit) and a memory for example. The control unit 31 controls the respective units of the image processing apparatus 30. The communication unit 32 is connected to the communication line, and make communication to an external device through the communication line. As the external device, there is a facsimile machine beside the imaging device 10 and the detecting device 20. The operation unit 33 is configured with a touch panel and a key, for example. The operation unit 33 inputs a signal in the control unit 31 according to a user's operation. The display unit 34 is configured with a liquid crystal display, for example. The display unit 34 displays various types of information. The storage unit 35 is configured with a hard disk, for example. The storage unit 35 stores programs executed by the CPU and various types of data.

The image reading unit 36 is configured with an image scanner, for example. The image reading unit 36 reads out an image of an original document to generate image data. The image forming unit 37 is configured with a printer, for example. The image forming unit 37 forms an image according to the image data on a medium such a sheet. The image forming unit 37 may form an image with an electrophotographic process, or may form an image in other processes. The power source circuit 38 supplies power to the respective units of the image processing apparatus 30.

The image processing apparatus 30 has a normal operation mode (first operation mode) and a power saving mode (second operation mode). The normal operation mode is an operation mode in which various types of processes are executed according to instructions. In the normal operation mode, the power is supplied from the power source circuit 38 to the respective units of the image processing apparatus 30. The power saving mode is an operation mode in which the power consumption is lesser than the normal operation mode. In the power saving mode, the power is supplied from the power source circuit 38 to parts of the image processing apparatus 30. For example, in the power saving mode, the power is kept on supplying to the control unit 31, the storage unit 35, the image reading unit 36, the image forming unit 37, and the display unit 34, but the power is not supplied to the other portions.

Figure 3:
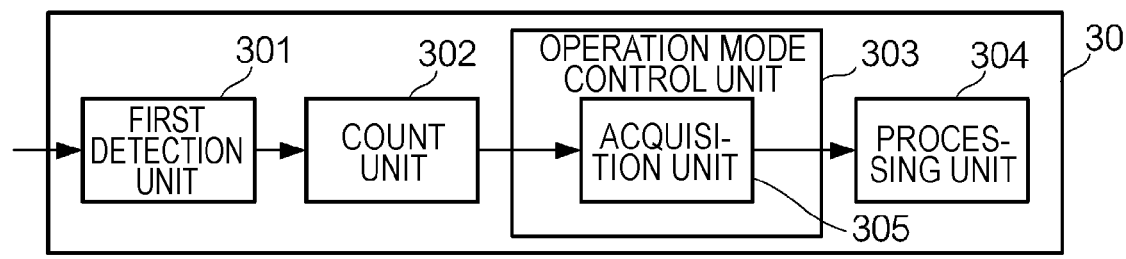
FIG. 3 is a diagram illustrating a functional configuration of the image processing apparatus.

FIG. 3 is a diagram illustrating a functional configuration of the image processing apparatus 30. The image processing apparatus 30 includes a first detection unit 301, a count unit 302, an operation mode control unit 303, and a processing unit 304. The first detection unit 301, the count unit 302, and the operation mode control unit 303 are realized by a program which is executed by the CPU, for example. The processing unit 304 is realized by the image reading unit 36, the image forming unit 37, or the communication unit 32 under the control of the control unit 31 for example.

The first detection unit 301 detects a person who goes in and out through the entrance of the area in cooperation with the imaging device 10. Specifically, the first detection unit 301 sets a count line in the vicinity of the entrance in the image received from the imaging device 10. When a person goes in the image taking range 11, the first detection unit 301 performs the image processing using the image received from the imaging device 10 to generate a traffic line of that person. In a case where the generated traffic line traverse the count line in a direction of going into the area, the first detection unit 301 detects the person who goes into the area through the entrance. On the other hand, in a case where the generated traffic line traverses the count line in a direction of going out of the area, the first detection unit 301 detects the person who goes out of the area through the entrance.

The count unit 302 counts the number of persons who go into the area using the detection result of the first detection unit 301. For example, in a case where the first detection unit 301 detects a person who goes into the area through the entrance, the count unit 302 increases the number of persons in the area by "1". On the other hand, in a case where the first detection unit 301 detects a person who goes out of the area through the entrance, the count unit 302 decreases the number of persons in the area by "1".

A person (for example, a clerk of a store) who is not a user of the image processing apparatus 30 is not counted to the number of persons in the area even when the person goes in through the entrance. Specifically, the face image of the person who is not a user of the image processing apparatus 30 is registered in the image processing apparatus 30 in advance. The face image is stored in the storage unit 35. The first detection unit 301 performs the image processing using the image received from the imaging device 10 to collate the face image of a person coming into the area through the entrance with the face image stored in the storage unit 35. As a result of collation, in a case where a degree of similarity between these face images is higher than a threshold (third threshold), the first detection unit 301 determines that the subject person is an out-of-target. The count unit 302 counts up the number of persons in the area except the number of persons who are determined as the out-of-target by the first detection unit 301. Specifically, the count unit 302 does not change the number of persons in the area in a case where the person is determined as the out-of-target even when the first detection unit 301 detects that the person goes in and out through the entrance.

The operation mode control unit 303 includes an acquisition unit 305. The acquisition unit 305 acquires the number of persons counted by the count unit 302. The operation mode control unit 303 controls the operation mode according to the number of persons acquired by the acquisition unit 305. Specifically, in a case where the acquired number of persons reaches a threshold (first threshold), the operation mode control unit 303 activates the image processing apparatus 30 in the power saving mode. In addition, in a case where the acquired number of persons is less than a threshold (second threshold), the operation mode control unit 303 disconnects the power source of the image processing apparatus 30.

In addition, the operation mode control unit 303 controls the operation mode according to the detection result or the determination result of the detecting device 20. Specifically, in a case where it is determined that a person detected in the detecting range 21 by the detecting device 20 is in front of the image processing apparatus 30 while facing the image processing apparatus 30 after the image processing apparatus 30 is activated, the operation mode control unit 303 switches the operation mode of the image processing apparatus 30 from the power saving mode to the normal operation mode. In addition, when a person is not detected in the detecting range 21 by the detecting device 20 after the operation mode of the image processing apparatus 30 is switched to the normal operation mode, the operation mode control unit 303 switches the operation mode of the image processing apparatus 30 from the normal operation mode to the power saving mode.

The processing unit 304 performs a process according to an instruction during the normal operation mode. For example, when the user operates the operation unit 33 to make an instruction, the processing unit 304 performs a copy process, a print process, or a facsimile transmission process according to the instruction.

2. Operation

Figure 4:
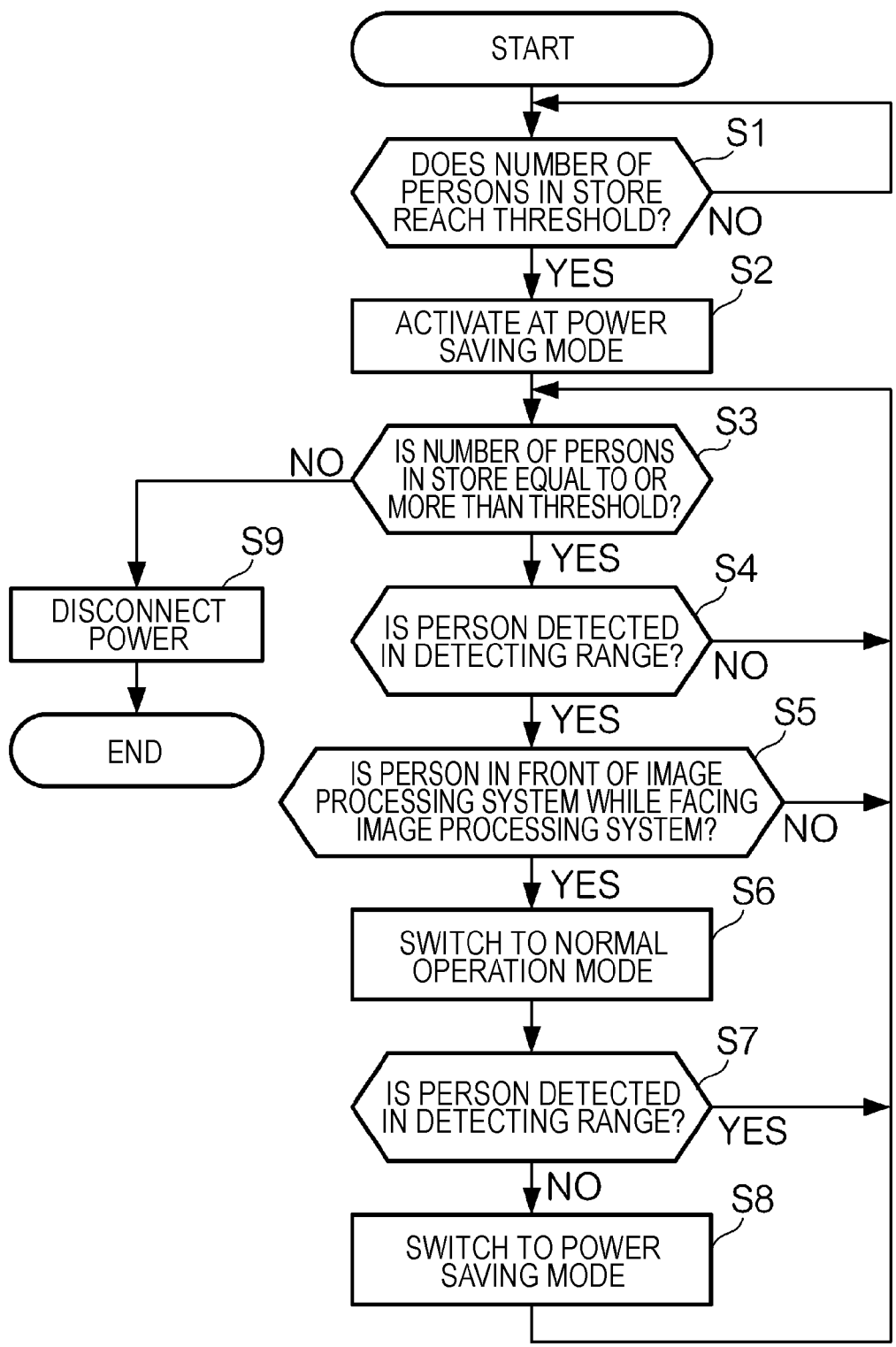
FIG. 4 is a flowchart illustrating an operation of the image processing apparatus.

FIG. 4 is a flowchart illustrating an operation of the image processing apparatus 30. In this example, the image processing system 1 is installed in a store such as a convenience store. As an initial state, it is assumed that there are two clerks indoors and no customer therein. Since the face images of the clerks are registered in the image processing apparatus 30 in advance, the number of clerks is not counted to the number of persons. Therefore, the number of persons in the store is "0" person in the initial state. In addition, the power of the image processing apparatus 30 is turned off in the initial state.

In Step S1, the operation mode control unit 303 determines whether the number of persons in the store reaches a threshold (first threshold). In this example, the threshold is set to "1" person in advance. In a case where it is determined that the number of persons in the store is less than the threshold (NO in Step S1), the operation mode control unit 303 performs the determination repeatedly. On the other hand, when one customer goes in the store through the entrance for example, the person coming into the store through the entrance is detected by the first detection unit 301. When the person coming into the store through the entrance is detected by the first detection unit 301, the count unit 302 increases the number of persons in the store by "1". Therefore, the number of persons in the store becomes "1". In this case, the operation mode control unit 303 determines that the number of persons in the store reaches the threshold. In a case where it is determined that the number of persons in the store reaches the threshold (YES in Step S1), the operation proceeds to Step S2.

In Step S2, the operation mode control unit 303 makes the image processing apparatus 30 activated in the power saving mode. Specifically, the power source circuit 38 supplies the power to parts of the image processing apparatus 30 under the control of the control unit 31.

In Step S3, the operation mode control unit 303 determines whether the number of persons in the store is equal to or more than the threshold. In a case where it is determined that the number of persons in the store is less than the threshold (NO in Step S3), the operation proceeds to Step S9. On the other hand, for example, in a case where the customer coming into the store through the entrance remains in the store, the number of persons in the store does not change but remains in "1". In this case, the operation mode control unit 303 determines that the number of persons in the store is equal to or more than the threshold. In a case where it is determined that the number of persons in the store is equal to or more than the threshold (YES in Step S3), the operation proceeds to Step S4.

In Step S4, the operation mode control unit 303 determines whether a person is detected in the detecting range 21. In a case where a person is not detected in the detecting range 21 (NO in Step S4), the operation returns to Step S3. On the other hand, for example, when the customer coming into the store approaches the image processing apparatus 30 and enters the detecting range 21, the detecting device 20 detects the customer. In this case, the detection information is transmitted from the detecting device 20 to the image processing apparatus 30. When the detection information is received from the detecting device 20, the operation mode control unit 303 determines that a person is detected in the detecting range 21. In a case where it is determined that a person is detected in the detecting range 21 (YES in Step S4), the operation proceeds to Step S5.

In Step S5, the operation mode control unit 303 determines whether the person detected in the detecting range 21 is in front of the image processing apparatus 30 while facing the image processing apparatus 30. For example, in a case where the person coming into the detecting range 21 passes by the image processing apparatus 30 without facing the image processing apparatus 30, the face facing forward is not recognized by the detecting device 20. Therefore, it is determined that the person detected in the detecting range 21 is in front of the image processing apparatus 30 but not facing the image processing apparatus 30. In this case, the second determination information is transmitted from the detecting device 20 to the image processing apparatus 30. When the second determination information is received from the detecting device 20, the operation mode control unit 303 determines that the person detected in the detecting range 21 is in front of the image processing apparatus 30 but not facing the image processing apparatus 30. In a case where it is determined that the person detected in the detecting range 21 is in front of the image processing apparatus 30 but not facing the image processing apparatus 30 (NO in Step S5), the operation returns to Step S3.

On the other hand, in a case where the person coming into the detecting range 21 stops in front of the image processing apparatus 30 and faces the image processing apparatus 30, the face facing forward is recognized by the detecting device 20. Therefore, it is determined that the person detected in the detecting range 21 is in front of the image processing apparatus 30 while facing the image processing apparatus 30. In this case, the first determination information is transmitted from the detecting device 20 to the image processing apparatus 30. When the first determination information is received from the detecting device 20, the operation mode control unit 303 determines that the person detected in the detecting range 21 is in front of the image processing apparatus 30 while facing the image processing apparatus 30. In a case where the person detected in the detecting range 21 is in front of the image processing apparatus 30 while facing the image processing apparatus 30 (YES in Step S5), the operation proceeds to Step S6.

In Step S6, the operation mode control unit 303 switches the operation mode of the image processing apparatus 30 from the power saving mode to the normal operation mode. Specifically, the power source circuit 38 supplies the power to the respective units of the image processing apparatus 30 under the control of the control unit 31. Therefore, the image processing apparatus 30 enters a state where a process according to an instruction is executable. For example, in a case where the operation unit 33 is operated by the person moved forward the image processing apparatus 30 and the print process is instructed, the print process is performed by the image forming unit 37 under the control of the control unit 31.

In Step S7, the operation mode control unit 303 determines whether a person is detected in the detecting range 21. During a period when the person is detected in the detecting range 21 (YES in Step S7), the operation mode control unit 303 makes the determination repeatedly. On the other hand, for example, when the person finishes the using of the image processing apparatus 30 and goes out of the detecting range 21, the person is not detected by the detecting device 20. In this case, the detection information is not transmitted from the detecting device 20 to the image processing apparatus 30. When the detection information is not received from the detecting device 20, the operation mode control unit 303 determines that the person is not detected in the detecting range 21. In a case where it is determined that the person is not detected in the detecting range 21 (NO in Step S7), the operation proceeds to Step S8.

In Step S8, the operation mode control unit 303 switches the operation mode of the image processing apparatus 30 from the normal operation mode to the power saving mode. Specifically, the power source circuit 38 keeps on supplying the power to parts of the image processing apparatus 30, and on the other hand stops supplying the power to the other portions under the control of the control unit 31.

After Step S8, the operation returns to Step S3. For example, when the person finishes the using of the image processing apparatus 30 goes out of the store through the entrance, the person going out of the store through the entrance is detected by the first detection unit 301. When the person going out of the store through the entrance is detected by the first detection unit 301, the count unit 302 decreases the number of persons in the store by "1". Therefore, the number of persons in the store becomes "0". In this case, the operation mode control unit 303 determines that the number of persons in the store is less than a threshold (second threshold) (NO in Step S3). In this case, the operation proceeds to Step S9.

In Step S9, the operation mode control unit 303 turns off the power of the image processing apparatus 30. Specifically, the power source circuit 38 stops supplying the power to the respective units of the image processing apparatus 30 under the control of the control unit 31.

According to the above-described exemplary embodiment, when a person who is a prospective user of the image processing apparatus 30 (such as a customer visiting a store) comes into the area through the entrance, the image processing apparatus 30 is activated in the power saving mode. Furthermore, when the person (a prospective user) approaches the image processing apparatus 30 and stops in front of the image processing apparatus 30 while facing the image processing apparatus 30, the operation mode of the image processing apparatus 30 is switched from the power saving mode to the normal operation mode. In this case, when reaching the image processing apparatus 30, the user can use the image processing apparatus 30 without waiting for the switching of the operation mode. In other words, according to the above-described exemplary embodiment, it is suppressed the waiting time taken for the switching of the operation mode of the image processing apparatus 30. Therefore, the convenience of the user is not impaired.

In addition, in a case where there is no prospective user of the image processing apparatus 30 in the area even though there is a person (not a user such as a clerk in a store) in the area, the image processing apparatus 30 is kept in a power-off state without being activated. Therefore, the power consumption of the image processing apparatus 30 is reduced. In particular, in a 24-hour open store such as a convenience store, there is a time zone when there is no user of the image processing apparatus 30 while the clerk may be the only person in the store. When the image processing apparatus 30 is set to the power-off state in such a time zone, the power consumption is reduced.

In addition, according to the above-described exemplary embodiment, the operation mode is controlled according to the number of persons in the area even when the imaging device 10 and the detecting device 20 are not provided in the image processing apparatus 30. There may be already provided the imaging device 10 and the detecting device 20 for surveillance in the store such as a convenience store. When the image processing system 1 is configured using these devices, the cost is reduced.

3. Modifications

The above-described exemplary embodiment of the invention has been given as merely exemplary. The exemplary embodiment may be modified as follows. In addition, the following modifications may be implemented in combination.

(1) In the above exemplary embodiment, the detecting device 20 may be provided with a first human-body sensor and a second human-body sensor in place of the imaging device. The first human-body sensor detects a person in the detecting range 21 in a predetermined time interval using, for example, an infrared ray or an ultrasonic wave. When a person in the detecting range 21 is detected by the first human-body sensor, the detecting device 20 transmits the detection information to the image processing apparatus 30. The detection information is used for the determination in Steps S4 and S7.

In addition, in the modification, it may be determined whether the person detected in the detecting range 21 stops in front of the image processing apparatus 30 in Step S5. Specifically, the second human-body sensor detects whether there is a person in a determining range in a predetermined time interval using, for example, the infrared ray or the ultrasonic wave. The determining range is set in front of the image processing apparatus 30 in the detecting range 21. When a person is continuously detected in the determining range in a predetermined time by the second human-body sensor, the detecting device 20 determines that the person detected in the detecting range 21 stops in front of the image processing apparatus 30. In this case, the detecting device 20 transmits third determination information to the image processing apparatus 30. When the third determination information is received from the detecting device 20, the operation mode control unit 303 determines that the person detected in the detecting range 21 stops in front of the image processing apparatus 30 (YES in Step S5). In this case, the operation proceeds to Step S6.

On the other hand, in a case where a person is not detected in the determining range by the second human-body sensor, or in a case where a person is detected by the second human-body sensor but the person is not detected in the determining range before a predetermined time elapses, the detecting device 20 determines that the person detected in the detecting range 21 does not stop in front of the image processing apparatus 30. In this case, the detecting device 20 transmits fourth determination information to the image processing apparatus 30. When the fourth determination information is received from the detecting device 20, the operation mode control unit 303 determines that the person detected in the detecting range 21 does not stop in front of the image processing apparatus 30 (NO in Step S5). In this case, the operation returns to Step S3.

(2) In the above-described exemplary embodiment, a detecting device may be used in place of the imaging device 10. The detecting device is provided with plural human-body sensor. The plural human-body sensor is installed along a direction of a person who goes in and out through the entrance for example. The respective human-body sensors detect the person who goes in and out the area through the entrance in a predetermined time interval using the infrared ray or the ultrasonic wave for example. A person who goes in the area through the entrance and a person who goes out of the area through the entrance are identified according to an order that the plural human-body sensor detect the person. In a case where a person who goes in the area through the entrance is detected by the human-body sensors, the detecting device transmits first detection information to the image processing apparatus 30. When the first detection information is received from the detecting device, the count unit 302 increases the number of persons in the area by "1". On the other hand, in a case where a person who goes out of the area through the entrance is detected by the plural human-body sensors, the detecting device transmits second detection information to the image processing apparatus 30. When the second detection information is received from the detecting device, the count unit 302 decreases the number of persons in the area by "1". In the modification, the detecting device functions as a first detection unit of the invention. Therefore, there is no need to provide the first detection unit 301 in the image processing apparatus 30.

(3) In the above-described exemplary embodiment, the first detection unit 301 or the count unit 302 may be not provided in the image processing apparatus 30. For example, the imaging device 10 may be provided with the first detection unit 301 and the count unit 302. In this case, the communication unit 32 functions as an acquisition unit of the invention.

(4) In the above-described exemplary embodiment, the threshold used for the determination in Steps S1 and S3 may be set to a value containing the number of persons (such as clerks) who are not the user of the image processing apparatus 30. For example, in a case where there are two clerks and the image processing apparatus 30 is activated when one customer goes into the store, "3" obtained by adding the number of clerks to the number of customers may be set as the threshold. In this case, the face image of the clerk is not needed to be registered in the image processing apparatus 30.

In addition, the threshold used for the determination in Steps S1 and S3 may be changed according to a time zone. In this case, the number of clerks in every time zone may be registered in the image processing apparatus 30 in advance. The number of registered persons is stored in the storage unit 35. For example, it may be considered that the number of clerks from 10 a.m. to 12 p.m. is set to "2" and the number of clerks from 12 p.m. to 14 p.m. is set to "3". In a case where the image processing apparatus 30 is activated when one customer goes into the store, "3" obtained by adding the number of clerks to the number of customers in a time zone from 10 a.m. to 12 p.m. is set as the threshold. The number of clerks is increased by "1" in a time zone from 12 p.m. to 14 p.m. Therefore, the threshold is changed to "4" when it comes 12 p.m.

(5) In the above-described exemplary embodiment, the operation mode may be switched according to brightness in the store. In this case, an illuminance sensor is installed in the image processing apparatus 30 or in the vicinity of the image processing apparatus 30. The illuminance sensor measures an illuminance in the vicinity of the image processing apparatus 30. In a case where the illuminance measured by the illuminance sensor is lower than the threshold, the count unit 302 does not change the number of persons in the store even when a person comes into the store through the entrance. In a case where the illuminance in the vicinity of the image processing apparatus 30 is low (for example, a situation where a lighting is not turned on in the vicinity of the image processing apparatus 30 at night), a person coming into the store is less likely to use the image processing apparatus 30. Therefore, in such a case, the image processing apparatus 30 is not activated, and thus useless power consumption is prevented.

(6) In the above-described exemplary embodiment, the threshold used for the determination on whether the image processing apparatus 30 is activated may be not necessarily set to be equal to the threshold used for the determination on whether the power of the image processing apparatus 30 is turned off. For example, a first threshold may be used for the determination on whether the image processing apparatus 30 is activated, and a second threshold different from the first threshold may be used for the determination on whether the power of the image processing apparatus 30 is turned off.

(7) In the above-described exemplary embodiment, the detecting device 20 may be installed at a position other than the position where the face of the user of the image processing apparatus 30 is taken from the front side. The detecting device 20 may be installed in the vicinity of the image processing apparatus 30.

(8) In the above-described exemplary embodiment, the description has been made about an example where the processing unit 304 performs the image processing such as the copy process, the print process, and the facsimile transmission process. However, the processes performed by the processing unit 304 are not limited to the image processing. The processing unit 304 may perform processing other than the image processing. In addition, the invention is not limited to the configuration where the operation mode of the image processing apparatus 30 is controlled. The invention may be implemented to control the operation mode of the processing device which performs some sort of processing.

(9) In the above-described exemplary embodiment, the image processing apparatus 30 may be not necessarily configured to be activated in the power saving mode. The image processing apparatus 30 may be activated in the normal operation mode.

(10) In the above-described exemplary embodiment, the program executed by the CPU of the control unit 31 may be downloaded through a communication line such as the Internet. In addition, the program may be supplied in a recorded state in a computer-readable recording medium such as a magnetic recording medium (a magnetic tape or a magnetic disk), an optical recording medium (an optical disk), a magneto-optical medium, or a semiconductor memory.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control device comprising:
   an imaging device that takes an image of a range including an entrance of the area;
   a processor and a memory configured to implement the functions of:
   a first detection unit that detects a person who goes in and out through the entrance of the area based on the image taken by the imaging device;
   a count unit that counts up the number of persons in the area based on a detection result of the first detection unit;
   an acquisition unit that acquires the number of persons from the count unit;
   an operation mode control unit that controls an operation mode of a processing device according to the acquired number of persons; and
   a storage unit that stores a face image registered in advance,
   wherein the processor functioning as the first detection unit collates a face image of the person who goes in and out through the entrance with the face image stored in the storage unit, based on the image acquired from the imaging device, and determines that the person who goes in and out is an out-of-target in a case where a degree of similarity between the face images is higher than a third threshold as a result of the collation, and the processor functioning as the count unit counts the number of persons in the area except the number of persons who are determined as the out-of-target by the processor functioning as the first detection unit.

2. The control device according to claim 1, wherein the operation mode includes a first operation mode and a second operation mode in which power consumption is less than power consumption in the first operation mode, and in a case where the acquired number of persons reaches a first threshold, the operation mode control unit activates the processing device in the second operation mode.

3. The control device according to claim 2, wherein the operation mode control unit switches the operation mode of the processing device to the first operation mode from the second operation mode, in a case where a person is detected by a second detection unit that detects a person in a detecting range set in a vicinity of the processing device after the processing device is activated and the second detection unit determines that the person detected in the detecting range is in front of the processing device while facing the processing device or the person detected in the detecting range stops in front of the processing device.

4. The control device according to claim 3, wherein when the person is not detected in the detecting range by the second detection unit after the operation mode of the processing device is switched to the first operation mode, the operation mode control unit switches the operation mode of the processing device to the second operation mode from the first operation mode.

5. The control device according to claim 3, wherein the second detection unit is an imaging device or a sensor.

6. The control device according to claim 1, wherein the operation mode control unit turns off power of the processing device in a case where the acquired number of persons is smaller than a second threshold.

7. A processing device comprising:
a control device according to claim 1; and
a processing unit that performs a process according to an instruction during a first operation mode.

8. A control method of an operation mode of a processing device, comprising:
taking an image of a range including an entrance of an area;
acquiring the number of persons from a count unit, the count unit counting up the number of persons in an area using a detection result of a first detection unit, the first detection unit detecting a person who goes in and out through the entrance of the area based on the image; and
controlling an operation mode of a processing device according to the acquired number of persons,
wherein a face image of the person who goes in and out through the entrance is collated by the first detection unit with the face image stored in a storage unit, based on the image acquired from the imaging device, and the person who goes in and out is determined as an out-of-target in a case where a degree of similarity between the face images is higher than a third threshold as a result of the collation, and
the count unit counts the number of persons in the area except the number of persons who are determined as the out-of-target by the first detection unit.

9. A non-transitory computer readable medium storing a program causing a computer to a process for controlling an operation mode of a processing device, the process comprising:
taking an image of a range including an entrance of an area;
acquiring the number of persons from a count unit, the count unit counting up the number of persons in an area using a detection result of a first detection unit, the first detection unit detecting a person who goes in and out through the entrance of the area based on the image; and
controlling an operation mode of a processing device according to the acquired number of persons,
wherein a face image of the person who goes in and out through the entrance is collated by the first detection unit with the face image stored in a storage unit, based on the image acquired from the imaging device, and the person who goes in and out is determined as an out-of-target in a case where a degree of similarity between the face images is higher than a third threshold as a result of the collation, and
the count unit counts the number of persons in the area except the number of persons who are determined as the out-of-target by the first detection unit.

* * * * *